US008226160B2

United States Patent
Hirai et al.

(10) Patent No.: US 8,226,160 B2
(45) Date of Patent: Jul. 24, 2012

(54) VEHICULAR ROOF STRUCTURE

(75) Inventors: Shinji Hirai, Toyota (JP); Hitoshi Yasuda, Nagoya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 0 days.

(21) Appl. No.: 12/595,368

(22) PCT Filed: Mar. 21, 2008

(86) PCT No.: PCT/JP2008/055205
§ 371 (c)(1),
(2), (4) Date: Oct. 9, 2009

(87) PCT Pub. No.: WO2008/132897
PCT Pub. Date: Nov. 6, 2008

(65) Prior Publication Data
US 2010/0127537 A1 May 27, 2010

(30) Foreign Application Priority Data

Apr. 13, 2007 (JP) .................................. 2007-106217

(51) Int. Cl.
*B60J 3/02* (2006.01)
*B60J 7/00* (2006.01)
(52) U.S. Cl. ................... 296/214; 160/370.21; 160/201; 160/118; 296/97.11
(58) Field of Classification Search ................ 296/214, 296/97.11; 160/168.1, 168.1 R, 201, 113, 160/117, 118, 370.21
See application file for complete search history.

(56) References Cited

U.S. PATENT DOCUMENTS

| 3,163,892 | A | * | 1/1965 | Hager, Jr. ...................... 165/96 |
| 4,128,307 | A | * | 12/1978 | Badertscher et al. ......... 359/596 |
| 4,355,676 | A | * | 10/1982 | Lee ................................ 160/107 |
| 4,474,405 | A | * | 10/1984 | Kloppe et al. ............ 296/220.01 |
| 5,335,961 | A | | 8/1994 | Reinsch et al. |
| 5,421,635 | A | | 6/1995 | Reinsch et al. |
| 5,484,185 | A | * | 1/1996 | Salz et al. ................ 296/220.01 |
| 5,603,372 | A | | 2/1997 | Farmont et al. |
| 6,264,270 | B1 | * | 7/2001 | Farmont ........................ 296/223 |

(Continued)

FOREIGN PATENT DOCUMENTS

DE 4118409 11/1991

(Continued)

OTHER PUBLICATIONS

English language Abstract of EP 1625959, Feb. 15, 2006.

(Continued)

*Primary Examiner* — Dennis Pedder
(74) *Attorney, Agent, or Firm* — Greenblum & Bernstein, P.L.C.

(57) ABSTRACT

Provided is a vehicular roof structure, which can adjust the quantity of daylighting and which can be set to give a sense of spaciousness to a passenger in the rear seat by the wide field of view from the vehicular upper side while blocking the incident light upon the front seat side. Three louvers are enabled to change their angles of inclination with respect to the longitudinal direction of the vehicle. If the individual louvers arranged at the blocking positions are oriented to slope in a slightly downward direction of the vehicle toward the rear side thereof, a passenger in a rear seat can see, while an incident light to the front seat side is being blocked by the three louvers, the outside of the upper side of the vehicle through the three inclined louvers.

2 Claims, 9 Drawing Sheets

U.S. PATENT DOCUMENTS

| | | | |
|---|---|---|---|
| 6,282,911 B1 * | 9/2001 | Watanabe et al. | 62/244 |
| 6,382,714 B1 * | 5/2002 | Adam et al. | 296/223 |
| 2001/0030452 A1 * | 10/2001 | Karami et al. | 296/216.01 |
| 2004/0189058 A1 * | 9/2004 | Eiermann | 296/220.01 |
| 2009/0072574 A1 | 3/2009 | Tominaga et al. | |

FOREIGN PATENT DOCUMENTS

| | | |
|---|---|---|
| DE | 9402132 | 6/1995 |
| DE | 19527958 | 2/1996 |
| DE | 10317301 | 11/2004 |
| DE | 202004018915 | 2/2005 |
| EP | 1625959 | 2/2006 |
| EP | 1666292 | 6/2006 |
| GB | 2259284 | 3/1993 |
| JP | 26-7838 | 12/1951 |
| JP | 56-83423 | 7/1981 |
| JP | 62-14922 | 9/1987 |
| JP | 3-93209 | 9/1991 |
| JP | 6-179323 | 6/1994 |
| JP | 2007-22219 | 2/2007 |

OTHER PUBLICATIONS

English language Abstract of JP 6-179323, Jun. 28, 1994.
English language Abstract of DE 19527958, Feb. 15, 1996.
English language Abstract of DE 4118409, Nov. 21, 1991.
English language Abstract of JP 2007-22219, Feb. 1, 2007.

* cited by examiner

VEHICULAR ROOF STRUCTURE

TECHNICAL FIELD

The present invention relates to a vehicular roof structure that is capable of admitting daylight through an opening portion of a roof panel.

BACKGROUND ART

There are cases in which a vehicular roof has an opening portion formed therein for daylighting. In this kind of vehicular roof, in order to adjust the quantity of daylighting, for example, a plurality of roof shades arranged at the opening portion are made movable so as to open and close in the state of being connected together or being separated from one another (for example, refer to patent document 1).

However, the aforementioned conventional structure cannot be set to give a sense of spaciousness to a passenger in the rear seat by the wide field of view from the vehicular upper side while blocking the incident light to the front seat side.

Patent document 1: Japanese Patent Application Laid-Open (JP-A) No. 2007-22219

DISCLOSURE OF THE INVENTION

Problems to be Solved by the Invention

In consideration of the aforementioned circumstances, an object of the present invention is to provide a vehicular roof structure which can adjust the quantity of daylighting and which can be set to give a sense of spaciousness to a passenger in the rear seat by the wide field of view from the vehicular upper side while blocking the incident light to the front seat side.

Means for Solving the Problems

A first aspect of the present invention is a vehicular roof structure comprising: a roof panel having an opening portion for daylighting formed therein; and a plurality of light blocking members which are disposed further inside a vehicle interior than the roof panel and which can be respectively arranged at light blocking positions where incident light entering from the opening portion into the inside of the vehicle interior is blocked in the state in which the light blocking members are provided parallel to one another in the longitudinal direction of the vehicle, angles of inclination of the light blocking members being adjustable so as to slope in a downward direction of the vehicle towards the rear side thereof.

According to the vehicular roof structure of the first aspect, the plurality of light blocking members disposed further inside the vehicle interior than the roof panel can be respectively arranged at the light blocking positions where incident light entering from the opening portion of the roof panel into the vehicle interior is blocked in the state in which the light blocking members are provided parallel to one another in the longitudinal direction of the vehicle, and the angles of inclination of the light blocking members being adjustable so as to slope in a downward direction of the vehicle towards the rear side thereof. Therefore, the angles of inclination of the light blocking members disposed at the light blocking positions, with respect to the longitudinal direction of the vehicle, can be changed. As long as the light blocking members are arranged so as to be tilted in a slightly downward direction of the vehicle toward the rear side thereof, a passenger in a rear seat can see, while incident light to the front seat side is being blocked by the plurality of light blocking members, outside from the upper side of the vehicle through the plurality of light blocking members.

A second aspect of the present invention relates to the vehicular roof structure of the first aspect of the invention wherein the light blocking members are movable backward and forward between the light blocking positions and retracted positions at which the plurality of light blocking members overlap in the vertical direction of the roof and are retracted from the light blocking positions to one of the front side of the vehicle or the rear side of the vehicle.

According to the vehicular roof structure of the second aspect, the light blocking members are movable backward and forward between the light blocking positions and the retracted positions, and therefore, as the light blocking members are shifted in the backward or forward direction, the quantity of daylighting from the opening portion of the roof panel also changes depending on the positions of the light blocking members. Further, when the light blocking members are moved to the retracted positions, at which they are retracted to the front side of the vehicle or the rear side of the vehicle, from the light blocking positions, the plurality of light blocking members overlap in the vertical direction of the roof and are compactly stored.

A third aspect of the present invention relates to the vehicular roof structure of the second aspect of the invention including: a pair of guide rails disposed at both sides of the light blocking members, the both sides being in a widthwise direction orthogonal to the direction in which the light blocking members move backward and forward, the longitudinal direction of the pair of guide rails coinciding with the backward or forward direction of the light blocking members; moving portions respectively provided at both end portions in the widthwise direction of the light blocking members and respectively supported at one point by the pair of guide rails, the moving portions being movable along the longitudinal direction of the pair of guide rails; and an angle changing means which moves the light blocking members around a support point of the moving portions respectively supported by the pair of guide rails so as to change the angles of inclination of the light blocking members with respect to the longitudinal direction of the vehicle.

According to the vehicular roof structure of the third aspect, the longitudinal direction of the pair of guide rails coincides with the direction to which the light blocking members move backward and forward, and the moving portions respectively provided at both end portions in the widthwise direction of the individual light blocking members can be moved along the longitudinal direction of the pair of guide rails. Therefore, due to the moving portions moving along the longitudinal direction of the pair of guide rails, the light blocking members move in the backward or forward direction between the light blocking positions and the retracted positions. Further, each of the moving portions, which is provided at both end portions in the widthwise direction of the light blocking member, is supported by the corresponding guide rail at one point, and the angle changing means moves the light blocking members around the support point of the respective moving portions at the pair of guide rails and changes the angles of inclination of the light blocking members with respect to the longitudinal direction of the vehicle. Thus, as long as the angle of the inclination of each light blocking member moved to the light blocking position is changed by the angle changing means to an angle tilted in a slightly downward direction of the vehicle toward the rear side thereof, with light to the front seat side being blocked by the plurality of light blocking members, a passenger in the rear seat can see outside from the upper side of the vehicle through the tilted light blocking members.

A fourth aspect of the present invention relates to the vehicular roof structure of the third aspect of the invention wherein the angle changing means comprises: a pair of support rails disposed at the both sides of the light blocking members in the widthwise direction; supported portions respectively provided, apart from the moving portions, at the both end portions in the widthwise direction of the light blocking members and respectively movably supported by the pair of support rails in the backward or forward direction of the light blocking members; and a support rail moving means which actuates to move the pair of support rails in the vertical direction of the roof.

According to the vehicular roof structure of the fourth aspect, in the angle changing means, the supported portions respectively provided, apart from the moving portions, at each of the both end portions in the widthwise direction of the light blocking members are respectively movably supported by the pair of support rails so as to be movable in the backward or forward direction, and the support rail moving means actuates so as to move the pair of support rails toward the upper and lower sides of the roof. Therefore, at the time of actuation of the support rail moving means, the supported portions move via the pair of support rails in the vertical direction of the roof (to the upper side of the roof or to the lower side of the roof) and are disposed at the roof vertical direction side (at the upper side of the roof or at the lower side of the roof) of the moving portions. As a result, the light blocking members move around the support point of the moving portions by the pair of guide rails, and the angles of the inclination of the light blocking members with respect to the longitudinal direction are changed.

Effects of the Invention

As described above, the vehicular roof structure according to the first aspect of the present invention has an excellent effect that it can adjust the quantity of daylighting and can be set to give a sense of spaciousness to a passenger in the rear seat by the wide field of view from the vehicular upper side while blocking the incident light to the front seat side.

The vehicular roof structure according to the second aspect of the present invention has an excellent effect that it can expand the range of the quantity of daylighting that is adjustable, and can compactly store the light blocking members.

The vehicular roof structure according to the third aspect of the present invention has an excellent effect that the light blocking members can be moved backward and forward along the pair of guide rails, and the angles of inclination of the light blocking members can be changed while being supported by the pair of guide rails.

The vehicular roof structure according to the fourth aspect of the present invention has an excellent effect that the angles of inclination of the light blocking members can be changed simultaneously by using a relatively simple structure.

BEST MODE FOR CARRYING OUT THE INVENTION

Configuration of Exemplary Embodiments

An exemplary embodiment of the vehicular roof structure according to the present invention is explained using FIGS. 1 through 9. Note that in these figures, the upward direction of the vehicle is indicated by the UP arrow, the front side of the vehicle is indicated by the FR arrow, and the widthwise direction of the vehicle is indicated by the W arrow. Further, in the present embodiment, the upward direction of the vehicle is the same as the upper side of the vehicular roof.

Figure 1:
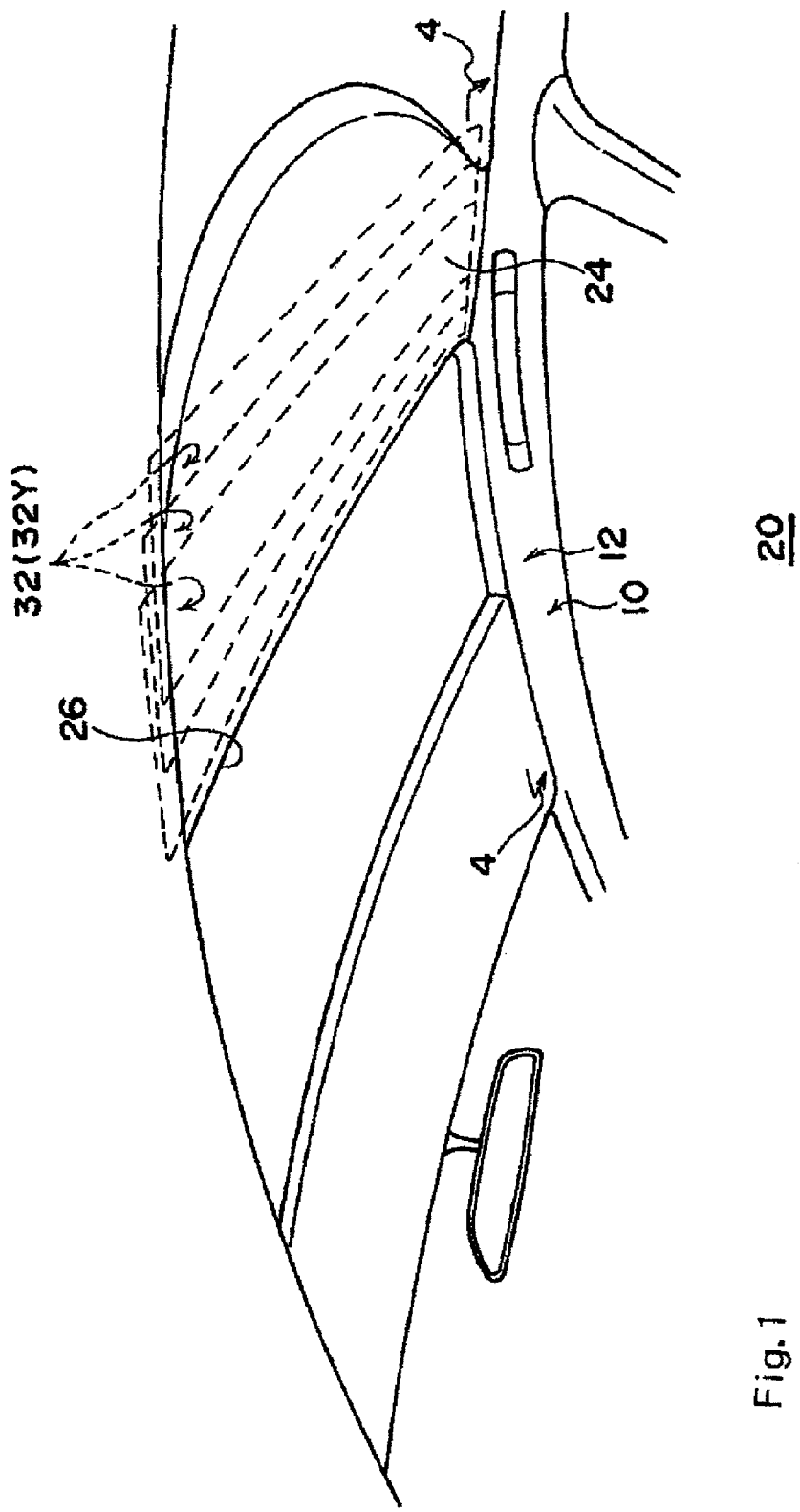
FIG. 1 is a perspective view showing the appearance of the upper section of a vehicle-interior of a vehicle, to which a vehicular roof structure according to an exemplary embodiment of the present invention is applied, in a state in which louvers are completely opened.
Figure 2:
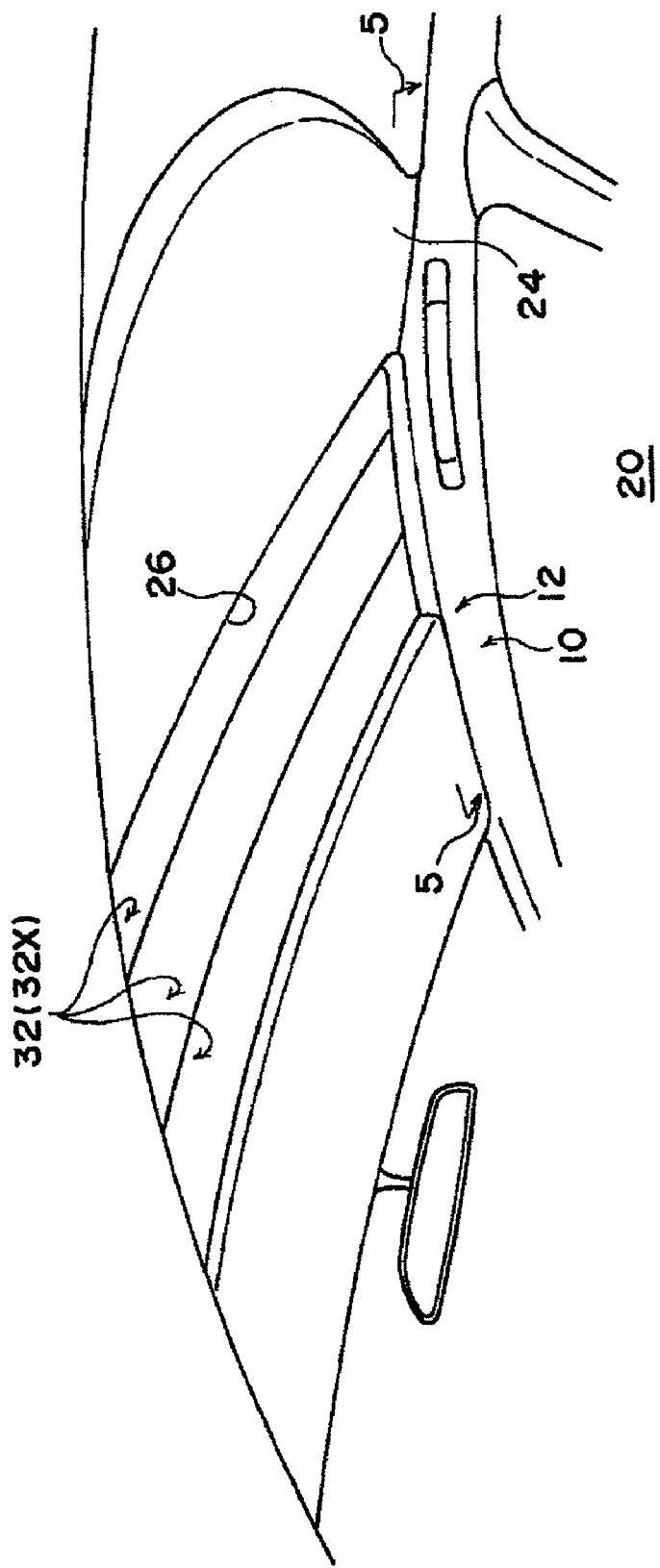
FIG. 2 is a perspective view showing the appearance of the upper section of a vehicle-interior of a vehicle, to which a vehicular roof structure according to an exemplary embodiment of the present invention is applied, in a state in which louvers are completely closed.
Figure 3:
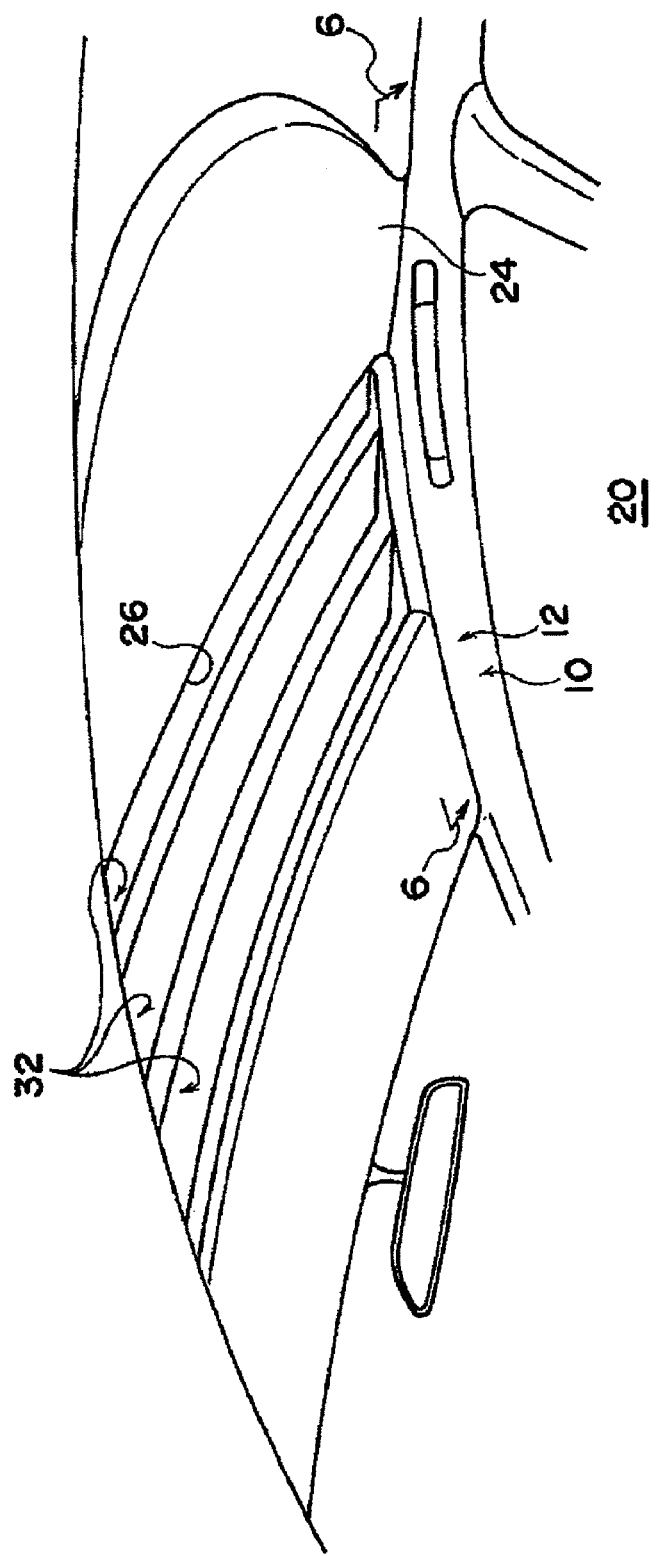
FIG. 3 is a perspective view showing the appearance of the upper section of a vehicle-interior of a vehicle, to which a vehicle roof structure according to an exemplary embodiment of the present invention is applied, in a state in which louvers are tilted.
Figure 4:
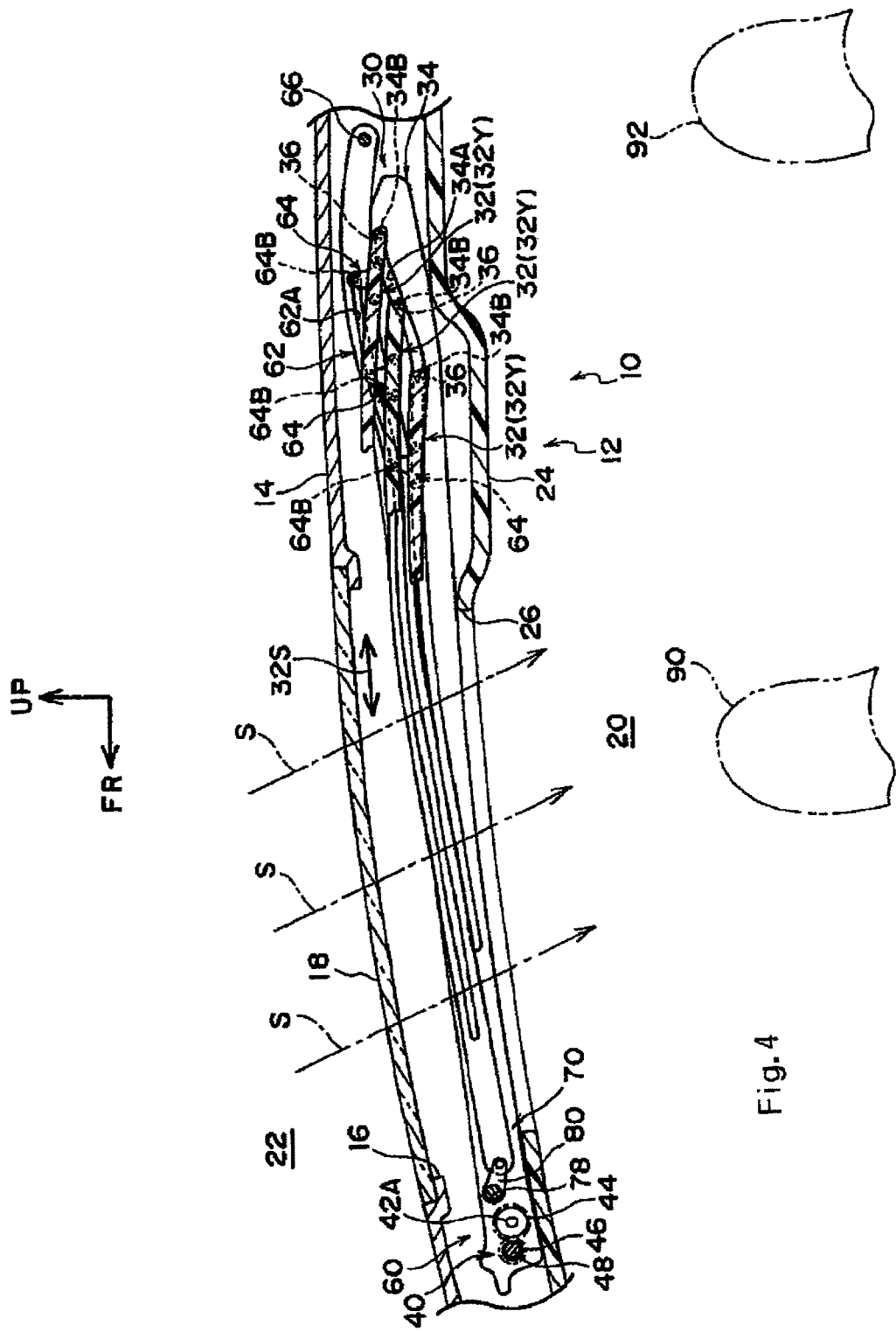
FIG. 4 is an enlarged cross-sectional view of the upper section of the vehicle interior taken along the line 4-4 in FIG. 1.
Figure 5:
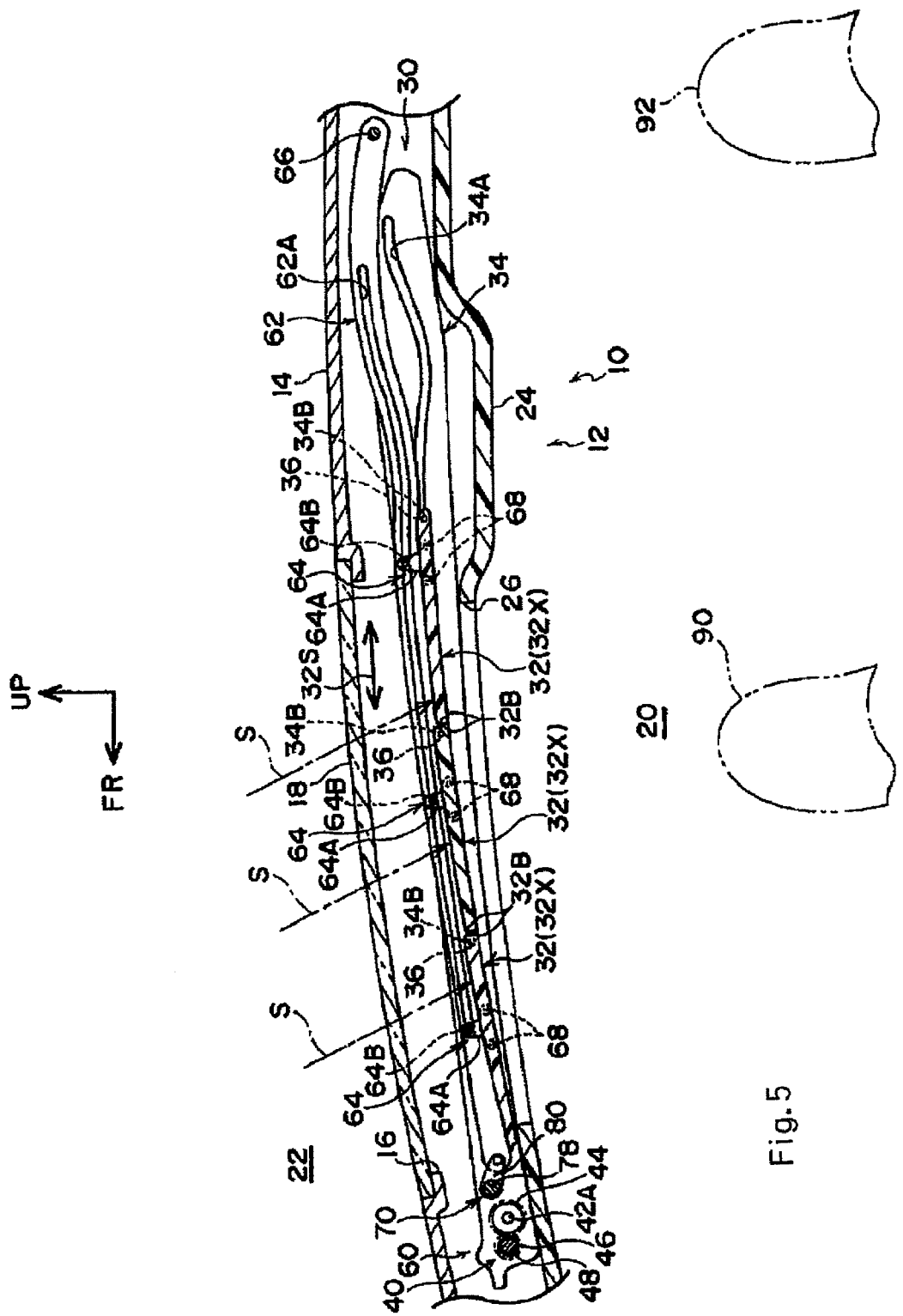
FIG. 5 is an enlarged cross-sectional view of the upper section of the vehicle interior taken along the line 5-5 in FIG. 2.
Figure 6:
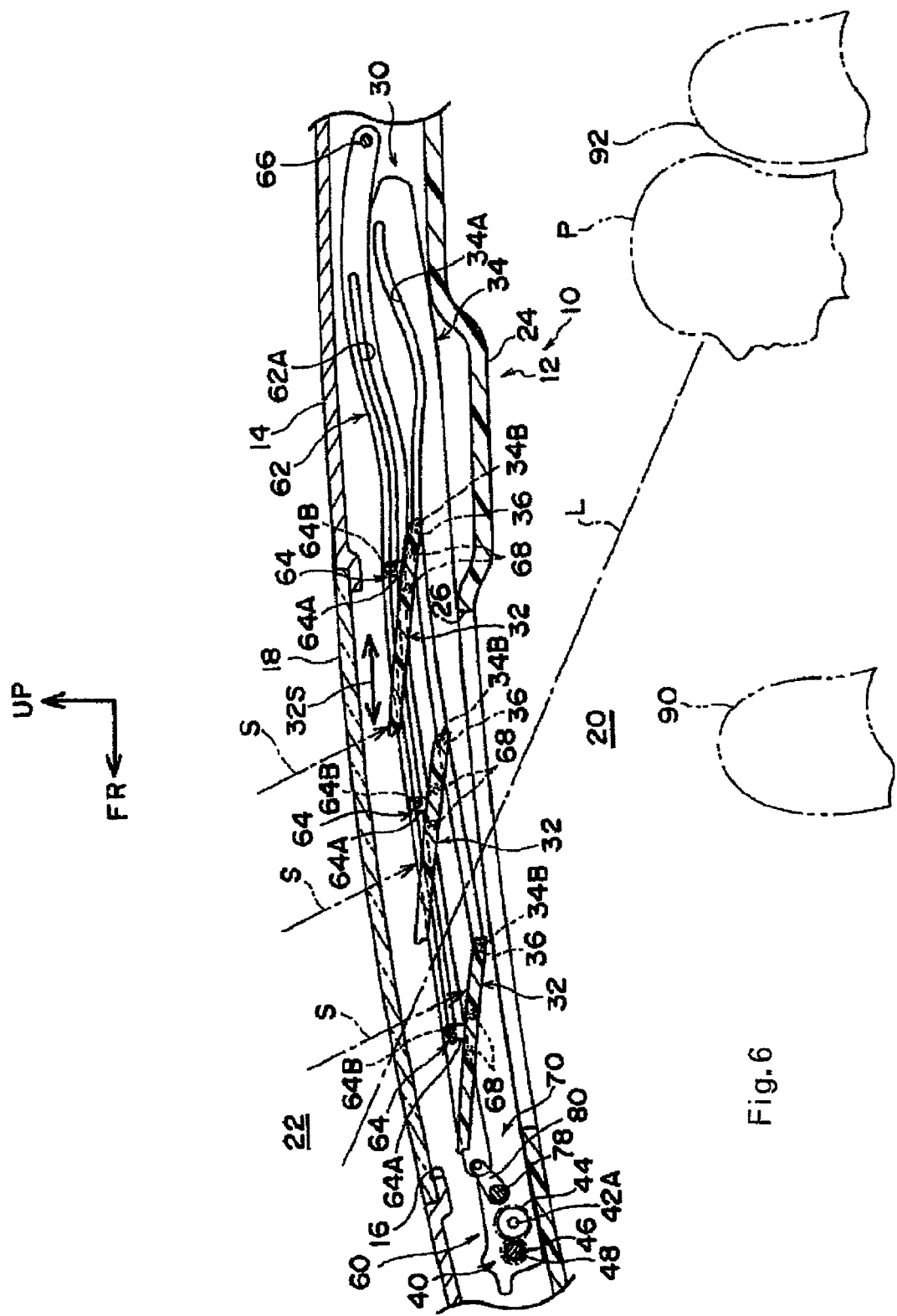
FIG. 6 is an enlarged cross-sectional view of the upper section of the vehicle interior taken along the line 6-6 in FIG. 3.

FIGS. 1 to 3 show the appearance of the upper section of the vehicle interior. As shown in these figures, a vehicle-body upper portion 10 is provided with a vehicular roof (daylighting roof) 12 which can adjust the quantity of daylighting by operation of a passenger, and the vehicular roof 12 is provided with louvers (louver vanes) 32 (see FIGS. 2 and 3, the louvers are described later in detail) each serving as a light blocking member which can open and close. FIGS. 4 through 6 are enlarged cross sectional views of the vehicular roof 12, to which the vehicular roof structure according to the present invention is applied, taken along the longitudinal direction of the vehicle. In these figures, the reference numbers 90 and 92 designate a front seat and a rear seat, respectively. Note that FIG. 1 and FIG. 4 show the state in which the louvers 32 are completely opened, FIG. 2 and FIG. 5 show the state in which the louvers 32 are completely closed, and FIG. 3 and FIG. 6 show the state in which the louvers 32 are tilted.

As shown in FIG. 4, a roof panel 14 which is a vehicle body panel of a roof body is provided at the outermost side of a vehicular roof 12 constituting the upper end portion of a vehicle interior 20, and a roof opening portion 16 which is an opening portion for daylighting is formed in the roof panel 14. A glass roof 18 which is a light transmitting member made of glass is disposed fixedly to the roof panel 14 by engagement and bonding, or the like, so as to close the roof opening portion 16.

The head-lining base material (also referred to as a roof head lining or a molded header) 24 is disposed substantially parallel to the roof panel 14 at the side of the roof interior finish that is further inside the vehicle interior 20 than the roof panel 14. The head-lining base material 24 is, by way of example, structured by and includes a base material layer consisting of a fiber molded body or a foam molded body formed from hard urethane, and a non-woven fabric outer layer covering the base material layer. A head-lining opening portion 26 is formed in the head-lining base material 24 and includes at least a part of a region opposite to the roof opening portion 16 at the inside of the vehicle interior. As shown in FIG. 1, the head-lining opening portion 26 is formed so as to have a substantially rectangular configuration.

Figure 7:
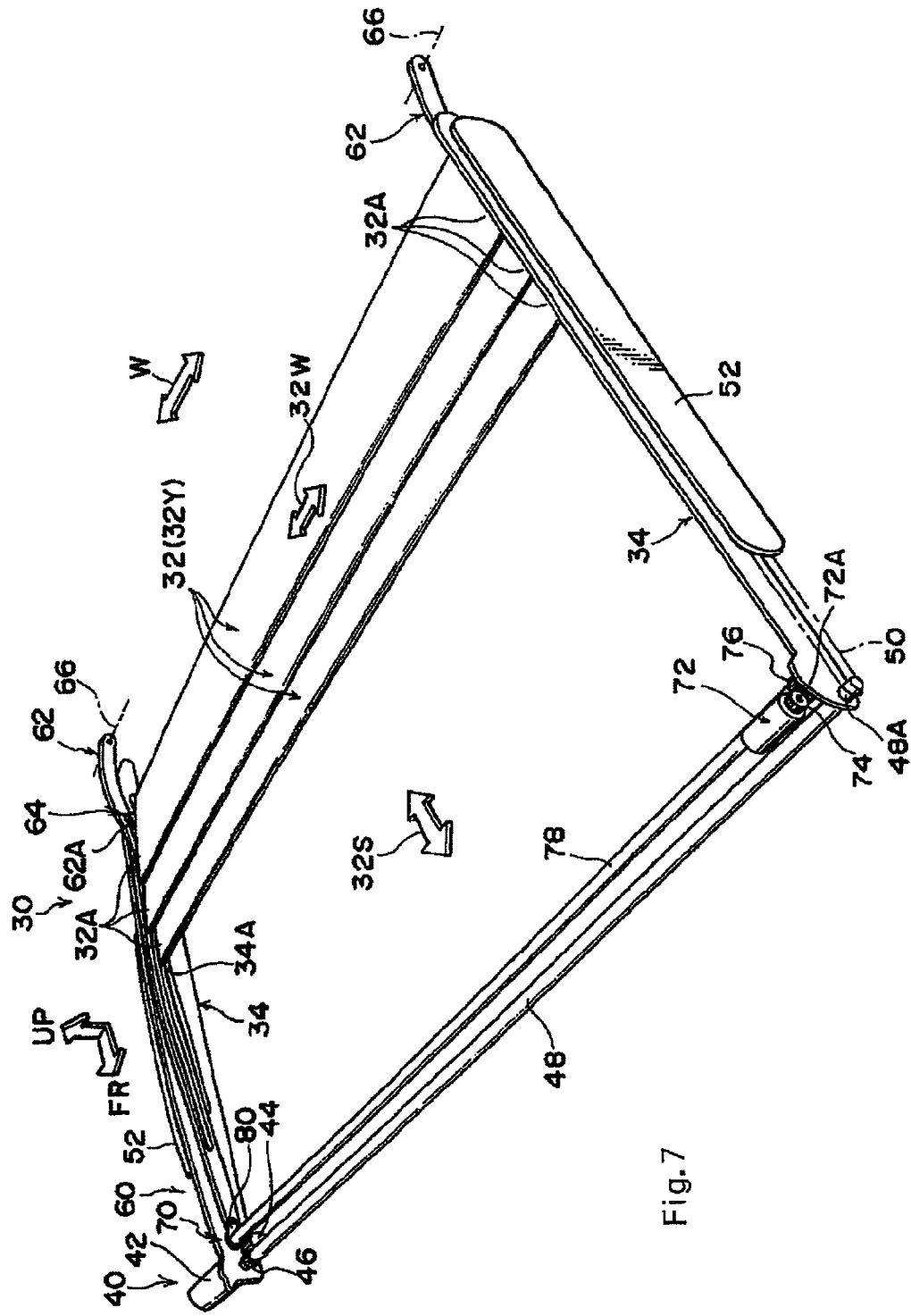
FIG. 7 is a perspective view showing a sunshade device of a vehicular roof structure according to an exemplary embodiment of the present invention in the state in which louvers are completely opened.
Figure 8:
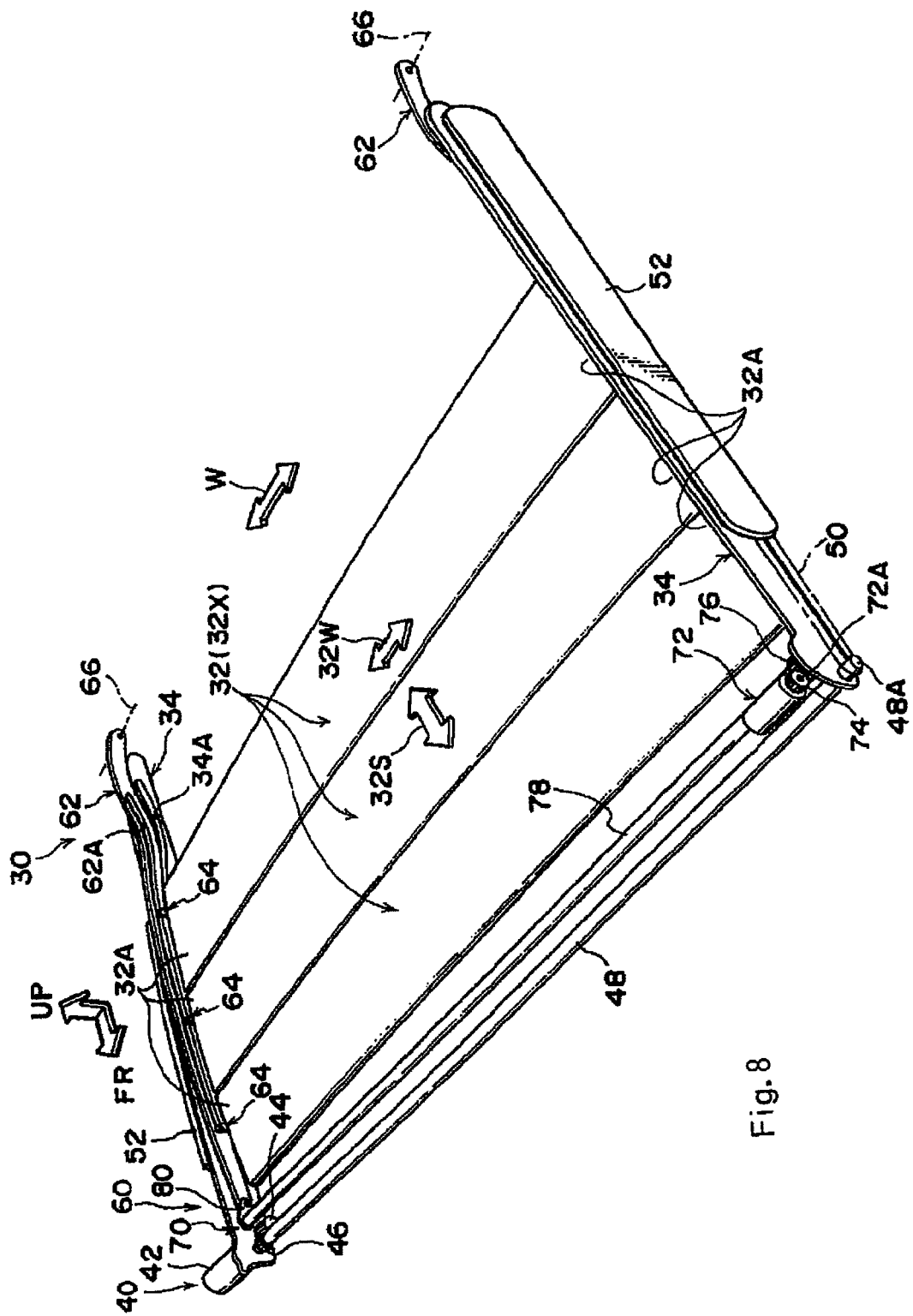
FIG. 8 is a perspective view showing a sunshade device of a vehicular roof structure according to an exemplary embodiment of the present invention in the state in which louvers are completely closed.
Figure 9:
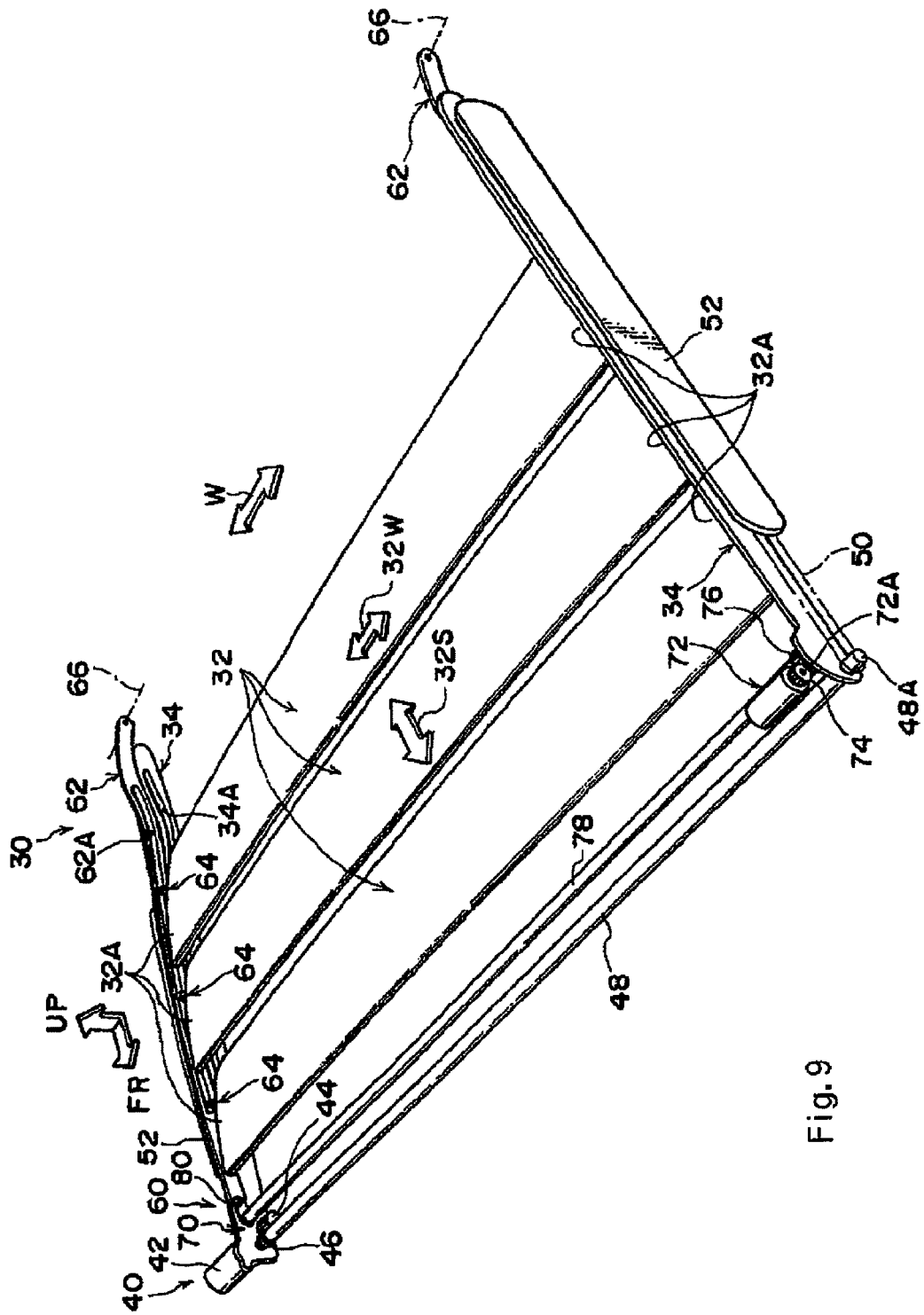
FIG. 9 is a perspective view showing a sunshade device of a vehicular roof structure according to an exemplary embodiment of the present invention in the state in which louvers are tilted.

As shown in FIG. 4, a louver-type sunshade device 30 equipped with a plurality of (in the present embodiment, three) louvers 32 is disposed further at the upper side of the roof than the head-lining base material 24 and further at the inner side of the vehicle interior than the roof panel 14. FIG. 7 through FIG. 9 each show a perspective view of the sunshade device 30. FIG. 7 shows the state in which the louvers 32 are completely opened, FIG. 8 shows the state in which the louvers 32 are completely closed, and FIG. 9 shows the state in which the louvers 32 are tilted. Both sides of the sunshade device 30 in the widthwise direction of the vehicle are fixed to roof side rails or the like, at both sides of the vehicle (not shown) in the widthwise direction within the vehicular roof shown in FIG. 4, and include the function of causing the louvers 32 to be disposed at predetermined setting positions by actuation. As an example, these louvers 32 are each structured and include a base material layer consisting of a resin board or the like having a light blocking property, and a non-woven fabric outer layer covering the base material layer, and are formed into a substantially rectangular thin plate (for example, a plate having a smaller plate thickness than the thickness of a board-like light blocking member) with the longitudinal direction thereof coinciding with the widthwise direction of the vehicle (refer to FIG. 7). As shown in FIG. 5, the louvers 32 are used to block incident light S (indicated by the arrow with a dashed line) entering into the vehicle interior 20 from the roof opening portion 16.

The louvers 32 are made movable backward and forward between light blocking positions 32X at which the incident light S entering into the vehicle interior 20 from the roof opening portion 16 is blocked, and retracted positions 32Y shown in FIG. 4 at which the louvers are retracted from the light blocking positions 32X toward the rear side of the vehicle. Here, as shown in FIG. 2 and FIG. 5, these louvers 32 can be respectively arranged at the light blocking positions 32X, in the state of being provided in parallel with one another in the longitudinal direction of the vehicle. On the contrary, as shown in FIG. 1 and FIG. 4, the plurality of louvers can be respectively arranged at the retracted positions 32Y, in such a manner as to be made to overlap in the vertical direction of the roof. As shown in FIG. 5, opposed end portions 32B of the louvers 32 abutting with each other in the longitudinal direction of the vehicle are stepped when seen from a side view, and the adjacent louvers 32 are adapted to engage with each other at the opposed end portions thereof at the light blocking positions 32X. Further, as shown in FIG. 3 and FIG. 6, the plurality of (three) louvers 32 are provided such that the angle of inclination thereof with respect to the longitudinal direction of the vehicle can be adjusted (described later in detail).

As shown in FIG. 7, a pair of guide rails 34 are respectively disposed at right and left sides in the widthwise direction of the vehicle. That is, a pair of guide rails 34 are respectively disposed at both sides in a widthwise direction of the louvers (the direction indicated by arrow 32W; in the present embodiment, the same direction as the widthwise direction of the vehicle and the widthwise direction of the sunshade device) orthogonal to the direction in which the louvers 32 moves backward and forward (the direction indicated by arrow 32S), with the longitudinal direction of the guide rails coinciding with the direction in which the louvers 32 moves backward and forward (the direction indicated by arrow 32S).

Each of the pair of guide rails 34 includes an oblong guide hole 34A that extends in the longitudinal direction of the guide rail 34 and penetrates in the widthwise direction of the vehicle. A slide pin 36 (refer to FIG. 4) made from metal, which serves as a moving portion, is fixed to each of end portions 32A of the louver 32 in the widthwise direction (the direction indicated by arrow 32W) and is disposed in the guide hole 34A in a slidable manner. Each of the slide pins 36 shown in FIG. 4 is disposed so that the axial direction thereof coincides with the widthwise direction of the louver 32 (the direction perpendicular to the surface of the paper of FIG. 4) at the rear end side of the louver 32 (the end portion side of the louver disposed at the rear side of the vehicle). The slide pins 36 are respectively supported at one point by the guide rails 34, at both sides in the widthwise direction of the louver 32, and are movable along the longitudinal direction of the pair of guide rails 34 (in the guide holes 34A). That is to say, due to the sunshade device 30 being structured in such a manner that the slide pins 36 are moved along the longitudinal direction of the pair of guide rails 34 (in the guide hole 34A), the louvers 32 are guided so as to be movable backward and forward between the light blocking positions 32X (see FIG. 5) and the retracted positions 32Y.

Further, as shown in FIG. 7, the louvers 32 are adapted to move backward and forward substantially in the longitudinal direction of the vehicle by the drive mechanism section 40 actuating. The drive mechanism section 40 is constituted to actuate by a predetermined operation of a passenger, and is structured by and includes a drive motor 42 for moving the louvers 32 backward and forward (for moving the louvers in the longitudinal direction of the vehicle), first and second gears 44, 46 for transmitting driving force of the drive motor 42, a rotating bar for backward and frontward movement 48, and a drive belt 50.

The drive motor 42 is provided at the outer side in the widthwise direction of the vehicle at the front end portion of the guide rail 34 (the end portion of the guide rail disposed at the front side of the vehicle), which is, among the pair of the guide rails 34, the guide rail 34 disposed at the left side when seen from the front side of the vehicle, so as to be fixed at a predetermined position at the inner side of the vehicular roof 12 (refer to FIG. 4). The first gear 44 provided inside of the drive motor 42 in the widthwise direction of the vehicle, with the guide rail 34 interposed therebetween, is secured coaxially to an output shaft 42A (refer to FIG. 4) of the drive motor 42, and is made rotatable in the state of engaging with the second gear 46. The second gear 46 is coaxially secured to the rotating bar for backward and frontward movement 48 at one end portion side thereof (at the left side when seen from the front side of the vehicle). The rotating bar for backward and frontward movement 48 is provided such that the longitudinal direction thereof coincides with the widthwise direction of the vehicle, and is supported rotatably at the front end portions of the pair of guide rails 34. In the rotating bar for backward and frontward movement 48, an endless bandshaped drive belt 50 for moving the louvers 32 backward and forward (in the longitudinal direction) is wrapped around the other end portion 48A of the rotating bar 48, which passes through the guide rail 34 disposed at the right side when seen from the front side of the vehicle.

The drive belt 50 is disposed along the guide rail 34 at the outer side thereof, which is provided at the right side when seen form the front side of the vehicle, in the widthwise direction of the vehicle. The drive belt 50 includes an side plate mounted thereto (not illustrated), and the slide pin 36 (refer to FIG. 4) passing through the guide hole 34A is fixed to the side plate. Due to the drive belt 50 moving circularly because of the aforementioned structure, the slide pin 36 (and the louvers 32) is moved in the direction in which the louvers 32 move backward and forward (the direction indicated by arrow 32S) via the side plate as mentioned above. Further, a side outer plate 52 constituting a part of a device frame is provided at the outer side of the guide rail 34 in the widthwise direction of the vehicle and is fixed at a predetermined position of the vehicular roof (refer to FIG. 4).

The sunshade device 30 includes an angle changing mechanism section 60 serving as angle changing means. The angle changing mechanism section 60 is structured by and includes a pair of supporting rails 62 disposed at both sides in the widthwise direction of the louvers 32 (the direction indicated by arrow 32W), sliders 64 provided, apart from the slide pins 36 shown in FIG. 6, at both ends portions 32A in the widthwise direction of the louver 32 (the direction indicated by arrow 32W) and serving as a supported portion that is supported so as to be movable in the backward-or-forward directions (the direction indicated by double-headed arrow 32S), and a support rail moving mechanism section 70 serving as support rail moving means that actuates by operation of the passenger and moves the support rail 62 to the upper and lower sides of the roof (in the upward and downward directions of the roof).

The support rail 62 is a rail for tilting the louvers 32 and is disposed at the inner side of the guide rail 34 in the widthwise direction of the vehicle, with the longitudinal direction thereof substantially coinciding with the longitudinal direction of the guide rail 34. A portion of the support rail 62 close to the position at the rear side of the vehicle is bent in a wavelike manner in the vertical direction of the roof. A shaft member 66 made from metal, which penetrates in the widthwise direction of the vehicle, is fixed at the end of each of the support rails 62 at the rear side of the vehicle, and the shaft member 66 serves as a fulcrum for tilting the louvers 32 by being supported rotatably at a predetermined position of the vehicular roof 12. An oblong hole 62A that extends along the longitudinal direction of the support rail 62 and penetrates therethrough in the widthwise direction of the vehicle is formed at each of the support rails 62. A slide pin 64B (refer to FIG. 4), made from metal, of the slider 64 is disposed in the oblong hole 62A in a slidable manner.

As shown in FIG. 6, the slider 64 is provided with a plate portion 64A having a metal flat plate-shaped configuration and also having an inversed T-shaped configuration when seen from the side of the vehicle. The lower part of the plate portion 64A is disposed further at the front side of the vehicle than the slide pin 36 with the longitudinal direction thereof coinciding with a direction of extending along the side end surfaces of both end portions 32A (refer to FIG. 9) of the louvers 32. At the same time, front and rear end portions of the lower part of the plate portion 64A when seen from the side of the vehicle are fixed to the side end surface at each of end portions 32A (refer to FIG. 9) of the louver 32 by screws 68. The upper part of the plate portion 64A is disposed further at the upper side of the roof than the louver 32, and the slide pin 64B is fixed to the outer side of the plate portion 64A in the widthwise direction of the vehicle. The axial direction of the slide pin 64B coincides with the widthwise direction of the louvers 32 (the direction perpendicular to the surface of the paper of FIG. 6), and is supported, at one point, by the support rail 62, and also is made movable along the longitudinal direction of the support rail 62 (oblong hole 62A). That is to say, the sides of the louver 32 in the widthwise direction of the louver are each supported, at one point, by the guide rails 34, respectively, via the slide pins 36, and are supported, at one point, by the support rail 62 via the slider 64.

As shown in FIG. 9, a support rail moving mechanism section 70 for moving the support rails 62 is structured by and includes a drive motor 72 for tilting which is disposed nearer the right-hand side when seen from the front side of the vehicle, first and second gears 74, 76 for transmitting driving force of the drive motor 72, a rotating bar for tilting 78, and a connecting strip 80.

The drive motor 72 is disposed at the inner side, in the widthwise direction of the vehicle, of the front end portion of the guide rail 34 (the portion of the guide rail disposed at the front side of the vehicle) at the right side of the pair of guide rails 34 when seen from the front side of the vehicle, and is fixed at a predetermined position in the vehicular roof 12 (refer to FIG. 6). The first gear 74 disposed at the outer side of the drive motor 72 in the widthwise direction of the vehicle is coaxially secured to the output shaft 72A of the drive motor 72, and is made rotatable while meshing with the second gear 76. The second gear 76 is coaxially secured to one end portion side (at the right side when seen from the front side of the vehicle) of the rotating bar for tilting 78. The rotating bar for tilting 78 is disposed parallel to the rotating bar for backward and frontward movement 48, with the longitudinal direction thereof coinciding with the widthwise direction of the vehicle, and supported rotatably at the front end portions of the pair of guide rails 34.

One end portion of the connecting strip 80 is secured to the left end portion of the rotating bar for tilting 78 when seen form the front side of the vehicle, and the connecting strip 80 is made to rotate integrally with the rotating bar for tilting 78 due to the rotation of the rotating bar for tilting 78 around the axial line thereof. The connecting strip 80 is formed in the shape of a short arm, and the other end portion of the connecting strip 80 is connected to the front end portion of the support rail 62 in a relatively rotatable manner around the axial line. For this reason, the support rail moving mechanism section 70 has a structure in which in the state in which the drive motor 72 is driven to rotate, the driving force is transmitted to the connecting strip 80 via the first and second gears 74, 76 and the rotating bar for tilting 78, so as to drive to rotate the connecting strip 80, and the support rail 62 is moved to rotate around the axial line of the shaft member 66 disposed at the rear end portion side of the support rail 62 while the support rail 62 is being slightly bent by rotating movement of the connecting strip 80 so as to be moved to the upper and lower sides of the roof.

Due to the aforementioned structure, the angle changing mechanism section 60 allows the support rail 62 to move to the upper and lower sides of the roof by the support rail moving mechanism section 70, thereby causing the slider 64 fixed to the louver 32 to move to the upper and lower sides of the roof. As a result, the louver 32 is moved around the support point 34B of the slide pin 36 by the guide rail 34, which is shown in FIG. 6, so as to change the angle of inclination of the louver 32 with respect to the longitudinal direction of the vehicle.

Operation and Effects of the Embodiments

Next, operation and effects of the aforementioned embodiment are explained.

As shown in FIG. 5, when three louvers 32 disposed further inside the vehicle interior 20 than the roof panel 14 are respectively provided at the light blocking positions 32X, in the state of being arranged parallel to one another in the longitudinal direction of the vehicle, the incident light S entering into the inside of the vehicle interior 20 from the roof opening portion 16 of the roof panel 14 is blocked. Further, when the louvers 32 are disposed at the retracted positions 32Y, at which they are retracted from the light blocking positions 32X to the rear side of the vehicle shown in FIG. 4, three louvers 32 overlap together in the vertical direction of the roof and are compactly stored, and the passenger in the front seat 90 (including a driver) and the passenger in the rear seat 92 each can enjoy a sense of spaciousness by the field of view from the vehicular upper side. Incidentally, the thickness of the louvers 32 is small, and therefore, a space between the head-lining base material 24 and the roof panel 14 can be set to be smaller (which leads to reduction of storage space), and restrictions of an inhabitable space in the vehicle interior 20 can be lessened.

Further, in the sunshade device 30, the longitudinal direction of the guide rails 34 coincides with the backward-or-forward direction of the louvers 32 (the direction indicated by arrow 32S), and the slide pins 36 provided at both end portions 32A (refer to FIG. 7) of the louvers 32 in the widthwise direction of the louvers are made movable along the longitudinal direction of the guide hole 34A of the guide rail 34. Accordingly, when the drive mechanism section 40 shown in FIG. 7 actuates by a predetermined operation of a passenger, the driving force of the drive motor 42 is transmitted to the first and second gears 44, 46, the rotating bar for backward and frontward movement 48, and the drive belt 50 in a sequential manner, and the slide pin 36 shown in FIG. 4 moves along the longitudinal direction of the guide hole 34A of the guide rail 34. As a result, the louvers 32 move in the backward-or-forward direction (in the direction indicated by arrow 32S) between the light blocking positions 32X shown in FIG. 5 to the retracted positions 32Y shown in FIG. 4. When the louvers 32 are displaced in the backward or forward directions (in the direction indicated by arrow 32S), the quantity of daylighting from the roof opening portion 16 of the roof panel 14 varies depending on the positions of the louvers 32. Accordingly, for example, as compared to a contrasting structure in which the light blocking member does not move in the backward or forward direction, the range of the quantity of daylighting that is adjustable broadens.

Further, as shown in FIG. 6, the slide pins 36 respectively provided at both end portions 32A (refer to FIG. 9) of the louver 32 in the widthwise direction of the louvers are each supported, at one point, by the guide rail 34, and when a predetermined operation is carried out by a passenger to change the angles of inclination of the louvers 32, the angle changing mechanism section 60 moves the louvers 32 around the support points 34B of the slide pins 36 to change of the angles of inclination of the louvers 32 with respect to the longitudinal direction of the vehicle. That is to say, the angle changing mechanism section 60 has a structure in which the sliders 64 provided, apart from the corresponding slide pins 36, at the vehicular front side of the both end portions 32A (refer to FIG. 9) in the widthwise direction of the louvers 32 are supported by the support rails 62 so as to be movable in the backward-or-forward direction (the direction indicated by arrow 32S), and the driving force of the drive motor 72 shown in FIG. 9 is transmitted to the first and second gears 74, 76, the rotating bar for tilting 78 and the connecting strip member 80 in a sequential manner, by operation of the support rail moving mechanism section 70, to move the support rails 62 in the upward direction of the roof. Therefore, at the time of operation of the support rail moving mechanism section 70, the sliders 64 move to the upper side of the roof via the support rails 62 and are disposed further at the upper side of the roof. As a result, the louvers 32 move around the support points 34B of the slide pins 36 by the guide rails 34, and at the same time, the angles of inclination of the louvers 32 in the longitudinal direction of the vehicle are changed.

Here, as long as the angle changing mechanism section 60 allows the angle of inclination of each louver 32 disposed at the light blocking position 32X (refer to FIG. 5) to be changed to an angle at which the louver is tilted slightly in a downward direction of the vehicle toward the rear side of the vehicle, as shown in FIG. 6, the passenger P seated in the rear seat 92 can see the outside 22 from the upper side of the vehicle through the three tilted louvers 32 in the state in which the incident light S toward the front seat 90 is blocked by the three louvers 32. Additionally, when the passenger P in the rear seat 92 looks up toward the front side of the vehicle, the visual line L of the passenger P is not substantially interrupted by the louvers 32, and therefore, the passenger P can see the outside 22 from the upper side of the vehicle through the three louvers 32 with a wide field of view.

As described above, the vehicular roof structure of the present embodiment allows adjustment of the quantity of daylighting, and can be set to give a sense of spaciousness to the passenger P in the rear seat 92 by the wide field of view from the vehicular upper side while blocking the incident light S upon the front seat 90 side (i.e., while protecting a driver from being subjected to glaring light). Incidentally, the change of the angles of inclination of the louvers 32 with respect to the longitudinal direction of the vehicle also becomes useful for fine adjustment of the quantity of daylighting.

Additional Description of the Embodiment

In the aforementioned embodiment, the louvers 32 are made movable backward and forward between the light blocking positions 32X (refer to FIG. 5) and the retracted positions 32Y (refer to FIG. 4), this embodiment being preferable. However, for example, the light blocking members may be another type of light blocking members such as light blocking members that can be provided at the light blocking positions but do not move backward or forward.

Further, in the aforementioned embodiment, as shown in FIG. 4, the retracted positions 32Y of the louvers 32 are the position of the louvers 32 retracted from the light blocking positions 32X (refer to FIG. 5) toward the rear side of the vehicle, but the retracting position of the light blocking members may be the positions retracted from the light blocking positions toward the front side of the vehicle. Further, in this embodiment, three louvers 32 arranged at the retracted positions 32Y overlap in the vertical direction of the roof while they are shifted in small amounts in the longitudinal direction of the vehicle, but a structure wherein a plurality of light blocking members arranged at the retracted positions overlap completely in the vertical direction of the roof is possible.

Moreover, in the aforementioned embodiment, as shown in FIG. 7, the pair of guide rails 34 are provided at both sides of the louvers 32 in the widthwise direction of the louvers 32 (the direction indicated by arrow 32W) with the longitudinal direction thereof coinciding with the backward-or-forward direction of the louvers (the direction indicated by arrow 32S). Due to the slide pins 36 (refer to FIG. 4) being guided by the guide rails 34 and moved in the backward-or-forward direction of the louvers (in the direction indicated by arrow 32S), the louvers 32 are moved backward and forward. However, the light blocking members may also be moved in the backward or forward direction using another structure in which such guide rails 34 are not be provided, and instead, pipe-shaped guiding members which are disposed at both inner sides in the widthwise direction of the vehicle of the vehicular roof 12 shown in FIG. 4 and also at the vehicular front side and rear side of the head-lining opening portion 26, with the longitudinal direction of the guiding members coinciding substantially with the longitudinal direction of the vehicle, and a wire which is inserted into each of the guiding members and is made movable substantially in the longitudinal direction of the vehicle with both ends portions of the light blocking member in the widthwise direction of the vehicle being mounted to the wire in a rotatable manner around the axial line along the widthwise direction of the vehicle is provided, and due to the wire being guided and moved in the guiding member, the light blocking members move in the backward or forward direction.

Additionally, for example, the angle of inclination of each light blocking member, which is mounted to the wire in the aforementioned exemplary structure, with respect to the longitudinal direction of the vehicle may also be changed by a solenoid or the like (angle changing means) that moves to rotate the light blocking members in a predetermined direction by magnetic force generated by applying electricity.

In the embodiment as mentioned above, the slide pins 36 serving as a moving portion are fixed to both end portions in the widthwise direction of the louver 32 (in the direction indicated by arrow 32W in FIG. 7), but the moving portion may be another type of moving portion in which a slide portion or the like is provided integrally with both end portions of the light blocking member and supported, at one point, by the pair of guide rails and which are made slidable (movable) along the longitudinal direction of the guide rails.

Still further, in the embodiment as mentioned above, the slide pin 36 serving as the moving portion is disposed slidably in the guide hole 34A of the guide rail 34, but the moving portion may also be another moving portion such as a guide roller or the like, which is mounted on each of both end portions of the light blocking member in the widthwise direction and is rollable (movable) along a guiding direction of the guide rail.

Furthermore, in the embodiment as mentioned above, the support point 34B of the slide pin 36 by the guide rails 34 is a point supporting the end portion of each louver 32 toward the rear side of the vehicle, but the support point of the moving portion by the guide rails may also be a point that supports another portion such as an end portion of each light blocking member toward the front side of the vehicle. In the case of using the structure in which the support point of the moving portion by the guide rails is the point which supports the end portion of each light blocking member toward the front side of the vehicle, for example, as long as a structure in which the support rail can be moved to the lower side of the roof with respect to the guide rails by actuation of the support rail moving means is adopted, the light blocking member can be set so as to be tilted slightly in a downward direction of the vehicle toward the rear side thereof.

As shown in FIG. 9, in the embodiment as mentioned above, the support rail moving mechanism section 70 which is structured by and includes the drive motor 72, the first and second gears 74, 76, the tilt rotating bar 78 and the connecting strip 80 is actuated so as to move the support rail 62 to the upper side of the roof, but the support rail moving means may also be another type of support rail moving means such as a solenoid, which moves the support rail to a vertical direction side of the roof (to the upper side of the roof and also to the lower side of the roof) by means of magnetic force generated by electricity at the time of actuating.

EXPLANATION OF REFERENCE NUMERALS

12: vehicular roof
14: roof panel
16: roof opening portion (opening portion)
20: vehicle interior
32: louver (light blocking member)
32A: both end portions in the widthwise direction
32S: direction of moving backward and forward
32W: widthwise direction of louvers (widthwise direction of light blocking members)
32X: light blocking position
32Y: retracted position
34: guide rail
34B: support point
36: slide pin (moving portion)
60: angle changing mechanism section (angle changing means)
62: support rail
64: slider (supported portion)
70: support rail moving mechanism section (support rail moving means)
S: incident light

What is claimed is:
1. A vehicular roof structure comprising:
a roof panel having an opening portion for incident light to enter into a vehicle interior;
a plurality of light blocking members movable along a pair of guide rails having guide holes extending along a longitudinal length thereof, the blocking members being disposed further inside the vehicle interior than the roof panel and which can be respectively arranged at light blocking positions such that the incident light entering into the vehicle interior is blocked,
the pair of guide rails being disposed at first and second sides of the light blocking members, the first and second sides being in a widthwise direction of the light blocking members orthogonal to a backward and forward moving direction of the light blocking members, a longitudinal length of the pair of guide rails coinciding with the backward and forward moving direction of the light blocking members,
moving portions having slide pins respectively provided at first and second end portions of the light blocking members in the widthwise direction of the light blocking members and respectively rotatably and slidably supported by the guide holes of the pair of guide rails,
the moving portions being movable along and about the longitudinal length of the pair of guide rails to position the light blocking members in at least one of a first light blocking position and a second light blocking position, and
an angle changing mechanism which moves the light blocking members around a support point of the moving portions respectively supported by the pair of guide rails so as to change the angles of inclination of the light blocking members with respect to the longitudinal direction of the vehicle,
the angle changing mechanism comprising a pair of support rails disposed at the first and second sides of the light blocking members in the widthwise direction of the light blocking members;

supported portions respectively provided, apart from the moving portions, at the first and second end portions in the widthwise direction of the light blocking members and respectively movably supported by the pair of support rails in the backward and forward moving direction of the light blocking members; and a support rail moving mechanism which actuates to move the pair of support rails in the vertical direction of the roof, wherein in the first light blocking position the light blocking members are positioned along the guide rails such that the light blocking members are generally aligned with one another in a longitudinal direction of the vehicle, wherein in the second light blocking position the light blocking members are positioned about the guide rails to adjust respective angles of inclination of each of the light blocking members relative to the longitudinal direction of the vehicle such that the light blocking members slope in a downward direction of the vehicle toward a rear side thereof, wherein the light blocking members are movable along the guide rails in the longitudinal direction of the vehicle in the backward and the forward moving direction between the light blocking positions and retracted positions, and wherein at the retracted positions the plurality of light blocking members overlap in a vertical direction of the roof and are retracted from the light blocking positions to at least the rear side of the vehicle.

2. A vehicular roof structure comprising:

a roof panel having an opening portion for incident light to enter into a vehicle interior;

a plurality of light blocking members provided along a pair of guide rails having guide holes extending along a longitudinal length thereof, the blocking members being disposed further inside the vehicle interior than the roof panel and which can be respectively arranged at light blocking positions such that the incident light entering into the vehicle interior is blocked;

moving portions having slide pins respectively provided at first and second end portions of the light blocking members in a widthwise direction of the light blocking members and respectively rotatably and slidably supported by the guide holes of the pair of guide rails, the moving portions being movable along and about the longitudinal length of the pair of guide rails; and an angle changing mechanism which moves the light blocking members around a support point of the moving portions respectively supported by the pair of guide rails so as to change the angles of inclination of the light blocking members with respect to a longitudinal direction of the vehicle, the angle changing mechanism comprising:

a pair of support rails disposed at the first and second sides of the light blocking members in the widthwise direction;

supported portions respectively provided, apart from the moving portions, at the first and second end portions in the widthwise direction of the light blocking members and respectively movably supported by the pair of support rails in a backward and forward moving direction of the light blocking members; and a support rail moving mechanism which actuates to move the pair of support rails in the vertical direction of the roof, wherein in a first light blocking position the light blocking members are positioned along the guide rails such that the light blocking members are generally aligned with one another in the longitudinal direction of the vehicle, wherein in a second light blocking position the light blocking members are positioned about the guide rails to adjust respective angles of inclination of each of the light blocking members relative to the longitudinal direction of the vehicle such that the light blocking members slope in a downward direction of the vehicle toward a rear side thereof, wherein the light blocking members are movable along the guide rails in the longitudinal direction of the vehicle in the backward and forward moving direction between the light blocking positions and retracted positions, and wherein at the retracted positions the plurality of light blocking members overlap in a vertical direction of the roof and are retracted from the light blocking positions to at least the rear side of the vehicle.

* * * * *